US012271610B2

(12) United States Patent
Wang et al.

(10) Patent No.: US 12,271,610 B2
(45) Date of Patent: Apr. 8, 2025

(54) METHOD, ELECTRONIC DEVICE, AND COMPUTER PROGRAM PRODUCT FOR DATA STORAGE

(71) Applicant: Dell Products L.P., Round Rock, TX (US)

(72) Inventors: Sheng Wang, Beijing (CN); Dapeng Chi, Beijing (CN); Huan Chen, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/227,037

(22) Filed: Jul. 27, 2023

(65) Prior Publication Data
US 2024/0241654 A1 Jul. 18, 2024

(30) Foreign Application Priority Data
Jan. 18, 2023 (CN) .......................... 202310075351.8

(51) Int. Cl.
*G06F 3/06* (2006.01)
(52) U.S. Cl.
CPC .......... *G06F 3/0631* (2013.01); *G06F 3/0604* (2013.01); *G06F 3/0689* (2013.01)
(58) Field of Classification Search
CPC ...... G06F 3/0631; G06F 3/0604; G06F 3/067; G06F 3/069; G06F 3/0619; G06F 3/0665; G06F 3/0689
See application file for complete search history.

(56) References Cited

U.S. PATENT DOCUMENTS

| 10,140,041 | B1 * | 11/2018 | Dong ................... G06F 3/0619 |
| 10,310,752 | B1 * | 6/2019 | Li ......................... G06F 3/0689 |
| 10,534,539 | B1 | 1/2020 | Gao et al. |
| 10,540,103 | B1 * | 1/2020 | Gao ....................... G06F 3/0619 |
| 2010/0199041 | A1 | 8/2010 | Schnapp et al. |
| 2020/0026450 | A1 * | 1/2020 | Han ...................... G06F 3/0689 |
| 2020/0133535 | A1 * | 4/2020 | Ma ........................ G06F 3/0647 |
| 2020/0349004 | A1 | 11/2020 | Ma et al. |
| 2021/0124504 | A1 | 4/2021 | Chiu et al. |

* cited by examiner

*Primary Examiner* — Tracy C Chan
(74) *Attorney, Agent, or Firm* — BainwoodHuang

(57) ABSTRACT

Techniques for data storage involve selecting a target Redundant Array of Independent Disks (RAID) from a plurality of RAIDs in a storage resource pool. Such techniques further involve determining a local neighbor matrix of the target RAID based on the target RAID, wherein the local neighbor matrix indicates distribution of a plurality of storage extents of a plurality of RAID extents of the target RAID on the storage resource pool. Such techniques further involve performing a resource reallocating operation on the storage resource pool based on the local neighbor matrix. Accordingly, a local neighbor matrix can be calculated at the granularity of an individual RAID, and the local neighbor matrix can be applied to balance a local neighboring relationship, so as to ensure overall balance of the neighbor matrix of the entire storage resource pool and improve IO performance.

20 Claims, 19 Drawing Sheets

300A

```
                  Neighbor matrix
      D0  D1  D2  D3  D4  D5  D6  D7  D8  D9
D0  000,004,004,004,005,004,003,004,000,000,
D1  004,000,004,004,004,004,004,004,000,000,
D2  004,004,000,004,004,004,003,005,000,000,
D3  004,004,004,000,004,004,004,004,000,000,
D4  005,004,004,004,000,004,003,004,000,000,
D5  004,004,004,004,004,000,004,004,000,000,
D6  003,004,003,004,003,004,000,003,000,000,
D7  004,004,005,004,004,004,003,000,000,000,
D8  000,000,000,000,000,000,000,000,000,000,
D9  000,000,000,000,000,000,000,000,000,000,
```

|    | D0 | D1 | D2 | D3 | D4 | D5 | D6 | D7 |
|----|----|----|----|----|----|----|----|----|
| D0 | 0  | 1  | 1  |    |    |    |    |    |
| D1 |    | 0  | 1  |    |    |    |    |    |
| D2 |    |    | 0  | 1  | 1  |    |    |    |
| D3 |    |    |    | 0  | 1  |    |    |    |
| D4 |    |    |    |    | 0  |    |    |    |
| D5 |    |    |    |    |    | 0  | 1  | 1  |
| D6 |    |    |    |    |    |    | 0  | 1  |
| D7 |    |    |    |    |    |    |    | 0  |

|    | D0 | D1 | D2 | D3 | D4 | D5 | D6 | D7 |
|----|----|----|----|----|----|----|----|----|
| D0 | 0  |    |    |    |    |    |    |    |
| D1 |    | 0  |    |    |    |    |    |    |
| D2 |    |    | 0  | 2  | 1  | 1  |    |    |
| D3 |    |    |    | 0  | 1  | 1  |    |    |
| D4 |    |    |    |    | 0  |    |    |    |
| D5 |    |    |    |    |    | 0  | 1  | 1  |
| D6 |    |    |    |    |    |    | 0  | 1  |
| D7 |    |    |    |    |    |    |    | 0  |

|    | D0 | D1 | D2 | D3 | D4 | D5 | D6 | D7 |
|----|----|----|----|----|----|----|----|----|
| D0 | 0  | 1  | 1  |    |    |    |    |    |
| D1 |    | 0  | 1  |    |    |    |    |    |
| D2 |    |    | 0  | 1  |    | 1  |    |    |
| D3 |    |    |    | 0  | 1  | 1  |    | 1  |
| D4 |    |    |    |    | 0  |    |    | 1  |
| D5 |    |    |    |    |    | 0  |    |    |
| D6 |    |    |    |    |    |    | 0  |    |
| D7 |    |    |    |    |    |    |    | 0  |

| | Calculation order of a local neighbor matrix | | | | |
|---|---|---|---|---|---|
| First round | RE0 RE1 RE2 | RE1 RE2 RE3 | RE3 RE4 RE5 | RE5 RE6 RE7 | ... |
| Second round | RE0 RE1 RE2 RE3 RE4 RE5 | RE1 RE2 RE3 RE4 RE5 RE6 | RE2 RE3 RE4 RE5 RE6 RE7 | RE3 RE4 RE5 RE6 RE7 RE8 | |
| Third round | RE0 RE1 RE2 RE3 RE4 RE5 RE6 RE7 RE8 | RE1 RE2 RE3 RE4 RE5 RE6 RE7 RE8 RE9 | RE2 RE3 RE4 RE5 RE6 RE7 RE8 RE9 RE10 | RE3 RE4 RE5 RE6 RE7 RE8 RE9 RE10 RE11 | |
| Fourth round | RE0 RE1 RE2 RE3 RE4 RE5 RE6 RE7 RE8 RE9 RE10 RE11 | RE1 RE2 RE3 RE4 RE5 RE6 RE7 RE8 RE9 RE10 RE11 RE12 | RE2 RE3 RE4 RE5 RE6 RE7 RE8 RE9 RE10 RE11 RE12 RE13 | RE3 RE4 RE5 RE6 RE7 RE8 RE9 RE10 RE11 RE12 RE13 RE14 | |
| ... | | | | | |

|    | D0 | D1 | D2 | D3 | D4 | D5 | D6 | D7 |
|----|----|----|----|----|----|----|----|----|
| D0 | 0  | 2  | 2  |    |    |    |    |    |
| D1 |    | 0  | 2  |    |    |    |    |    |
| D2 |    |    | 0  | 2  | 1  | 1  |    |    |
| D3 |    |    |    | 0  | 2  | 2  |    |    |
| D4 |    |    |    |    | 0  | 1  |    |    |
| D5 |    |    |    |    |    | 0  | 1  | 1  |
| D6 |    |    |    |    |    |    | 0  | 1  |
| D7 |    |    |    |    |    |    |    | 0  |

FIG. 9B

|    | D0 | D1 | D2 | D3 | D4 | D5 | D6 | D7 |
|----|----|----|----|----|----|----|----|----|
| D0 | 0  |    |    |    |    |    | 1  | 1  |
| D1 |    | 0  |    |    |    |    |    |    |
| D2 |    |    | 0  |    |    |    |    |    |
| D3 |    |    |    | 0  |    |    |    |    |
| D4 |    |    |    |    | 0  |    |    |    |
| D5 |    |    |    |    |    | 0  |    |    |
| D6 |    |    |    |    |    |    | 0  |    |
| D7 |    |    |    |    |    |    |    | 0  |

METHOD, ELECTRONIC DEVICE, AND COMPUTER PROGRAM PRODUCT FOR DATA STORAGE

CROSS-REFERENCE TO RELATED APPLICATION

This application claims priority to Chinese Patent Application No. CN202310075351.8, on file at the China National Intellectual Property Administration (CNIPA), having a filing date of Jan. 18, 2023, and having "METHOD, ELECTRONIC DEVICE AND COMPUTER PROGRAM PRODUCT FOR DATA STORAGE" as a title, the contents and teachings of which are herein incorporated by reference in their entirety.

TECHNICAL FIELD

Embodiments of the present disclosure relate to the field of computers, and more specifically, to a method, an electronic device, and a computer program product for data storage.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on a redundant array of independent disks (RAID) have been developed to improve data reliability. When one or a plurality of disks in a storage system fail, data in the failed disks may be reconstructed from data on another normally operating disk.

Mapped RAID has been developed at present. Each physical storage device is divided into several disk extents (DEs) of the same size. When a user creates a RAID, disk extents will be selected from all disks to form a newly created RAID extent (RE) that is mapped to the RAID. One mapped RAID can include a plurality of RAID extents. When the RAID extents are formed, uniform distribution of disk extents may ensure that user data can fully utilize the high performance of parallel input/output (I/O) processing of all disks in a storage resource pool. The RAID extents are evenly located on various disks, and therefore, if one of the disks fails, all or most of the other good-conditioned disks will participate in parallel reconstruction of the lost data of each RAID extent, so as to recover data from a physical storage device where the other RAID extents are located.

SUMMARY OF THE INVENTION

Embodiments of the present disclosure provide a method, an electronic device, and a computer program product for data storage.

According to a first aspect of the present disclosure, a method for data storage is provided. The method includes selecting a target Redundant Array of Independent Disks (RAID) from a plurality of RAIDs in a storage resource pool. The method further includes determining a local neighbor matrix of the target RAID based on the target RAID, wherein the local neighbor matrix indicates distribution of a plurality of storage extents of a plurality of RAID extents of the target RAID on the storage resource pool. The method further includes performing a resource reallocating operation on the storage resource pool based on the local neighbor matrix.

According to a second aspect of the present disclosure, an electronic device is further provided. The electronic device includes a processor and a memory coupled to the processor, wherein the memory has instructions stored therein, and the instructions, when executed by the processor, cause the device to perform actions. The actions include selecting a target RAID from a plurality of RAIDs in a storage resource pool. The actions further include determining a local neighbor matrix of the target RAID based on the target RAID, wherein the local neighbor matrix indicates distribution of a plurality of storage extents of a plurality of RAID extents of the target RAID on the storage resource pool. The actions further include performing a resource reallocating operation on the storage resource pool based on the local neighbor matrix.

According to a third aspect of the present disclosure, a computer program product is provided. The computer program product is tangibly stored on a computer-readable medium and includes computer-executable instructions, wherein the computer-executable instructions, when executed by a device, cause the device to perform a method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which:

FIG. 3A schematically shows a schematic diagram of a neighbor matrix according to an example implementation of the present disclosure;

FIG. 8B to FIG. 8D schematically show schematic diagrams of processes for determining local neighbor matrices for a specific RAID according to an example implementation of the present disclosure;

FIG. 9A schematically shows a schematic diagram of an iteration process of determining whether a specific RAID has local congestion according to an example implementation of the present disclosure;

FIG. 9B schematically shows a schematic diagram of an optimized local neighbor matrix for a specific RAID according to an example implementation of the present disclosure;

In all the accompanying drawings, identical or similar reference numerals indicate identical or similar elements.

DETAILED DESCRIPTION

Figure 1A:
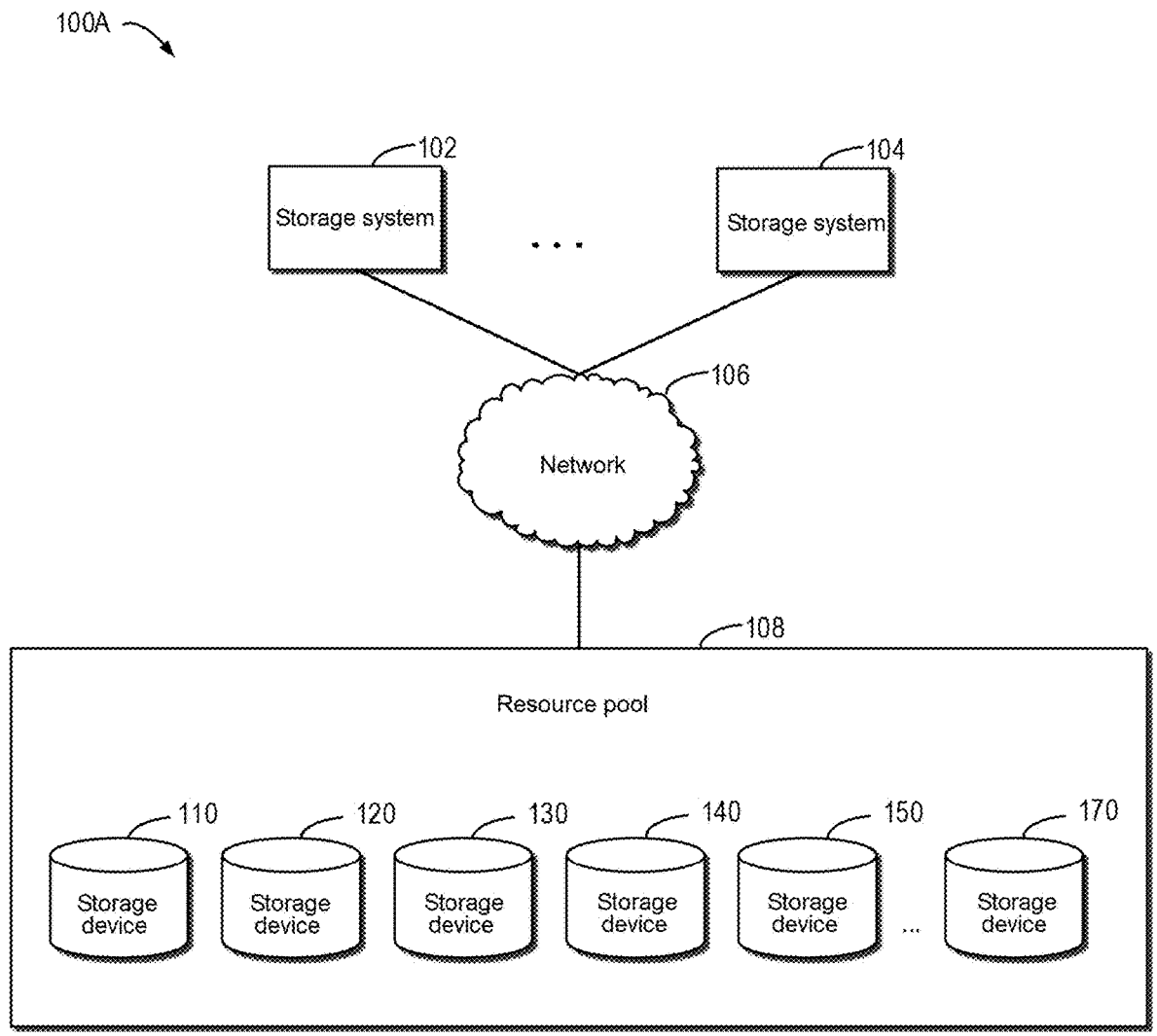
FIG. 1A schematically shows a block diagram of an example environment in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid in understanding, and are not intended to limit the scope.

Conventionally, in the field of data storage, a neighbor matrix is used as the basis for judging and managing the entire storage resource pool. The neighbor matrix can accurately and reasonably reflect a relationship among all the RAID extents in the storage resource pool, and therefore, it is a global neighbor matrix.

In the research, it is found that the conventional global neighbor matrix can only ensure the balance of a global association relationship, and the entire storage resource pool is globally balanced. However, it cannot determine whether local regions in the storage resource pool are also in a balanced state.

In view of this, the present disclosure provides a method for data storage. A local neighbor matrix is introduced to ensure that each local matrix of RAID is well balanced, and a global neighbor matrix of the entire storage resource pool is also in a desirable state. By dividing the matrix into a series of sub-matrices (i.e., local neighbor matrices) according to RAID levels. The local neighbor matrix takes an individual RAID as a basic unit, and the local neighbor matrix is calculated to determine whether there is local congestion. Moreover, the local neighbor matrix is used for balancing the local neighboring relationship.

FIG. 1A schematically illustrates a block diagram of example environment 100A in which a method of the present disclosure may be implemented. As shown in FIG. 1A, storage resource pool 108 may include a plurality of physical storage devices 110, 120, 130, 140, 150, . . . , 170. In this case, storage spaces in the plurality of storage devices may be allocated to a plurality of user storage systems 102, . . . , 104. In this case, user storage systems 102, . . . , 104 may access the storage spaces in the storage devices in storage resource pool 108 over network 106.

Figure 1B:
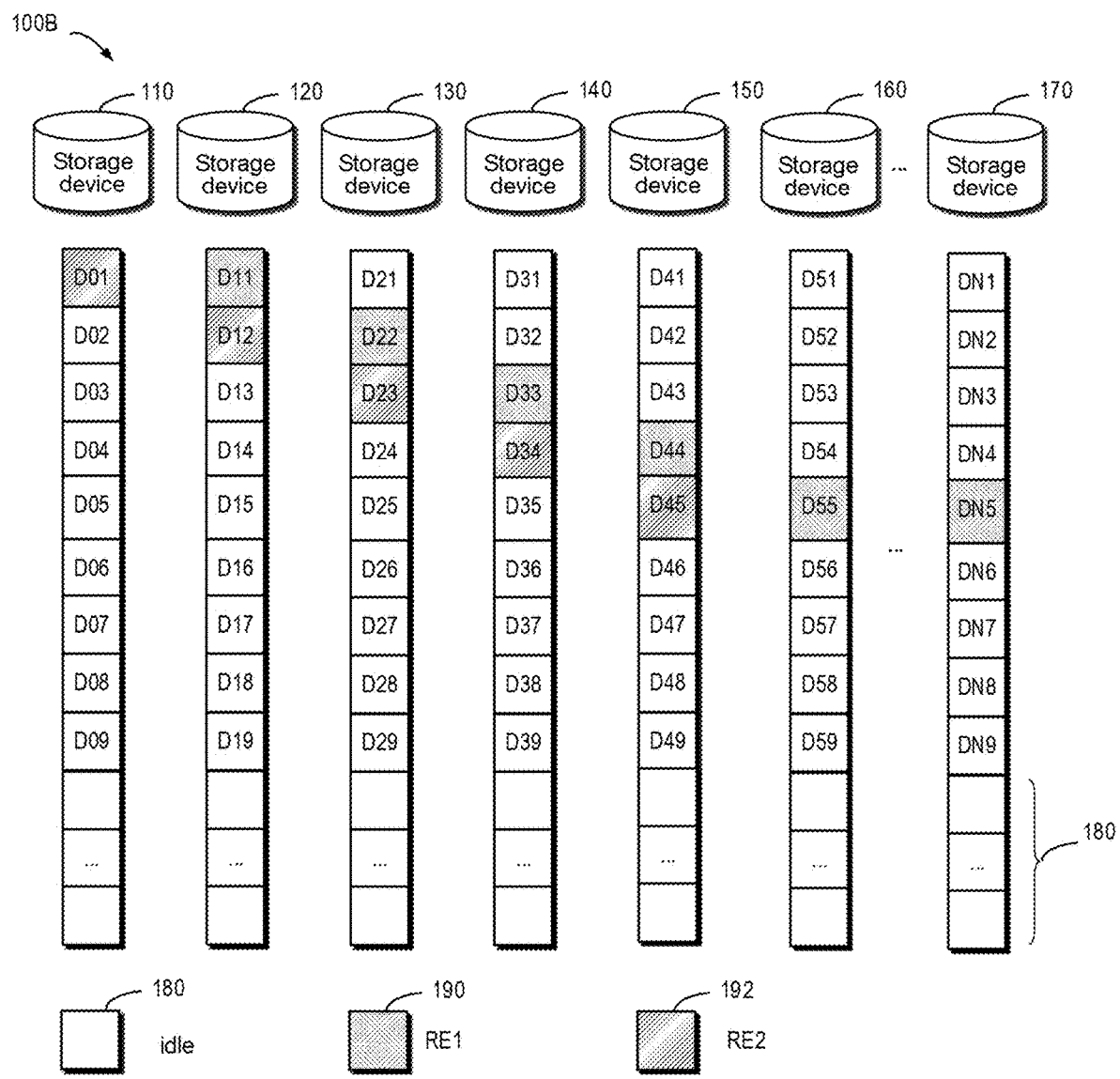
FIG. 1B schematically shows a block diagram of details of a storage resource pool in which a method of the present disclosure may be implemented.

FIG. 1B schematically shows a block diagram of details 100B of a storage resource pool in which a method of the present disclosure may be implemented. Resource pool 108 may include a plurality of storage devices 110, 120, 130, 140, 150, 160, . . . , 170. Each storage device may include a plurality of disk extents (DEs), where a DE is also referred to as a storage extent, legend 180 indicates an idle extent, legend 190 indicates a DE for RAID extent 1 (RE 1) of storage system 102 in FIG. 1, and legend 192 indicates a DE for RE 2 of storage system 102 in FIG. 1. In this case, extents D11, D22, D33, and D44 for RE 1 are used for storing data blocks of RE 1 respectively, and extent D55 is used for storing a parity of data. Extents D01, D12, D23, and D34 for RE 2 are respectively used for storing data blocks of RE 2, and extent D45 is used for storing a parity of data.

As shown in FIG. 1B, there may also be reserved idle part 180 in each storage device, so that when one storage device in the resource pool fails, an RE in idle part 180 in each storage device may be selected to reconstruct the REs in the failed storage device.

It should be noted that FIG. 1B only uses a 4D+1P RAID-5 storage system as an example to show how DEs in the REs are distributed in the plurality of storage systems in the resource pool. When other RAID levels are based and adopted, specific details may be implemented based on the above principles. For example, in a 6D+1P+1Q RAID-6 storage system, eight DEs in each RE may be distributed on a plurality of storage devices, thereby ensuring load balance of the plurality of storage devices.

Figure 2A:
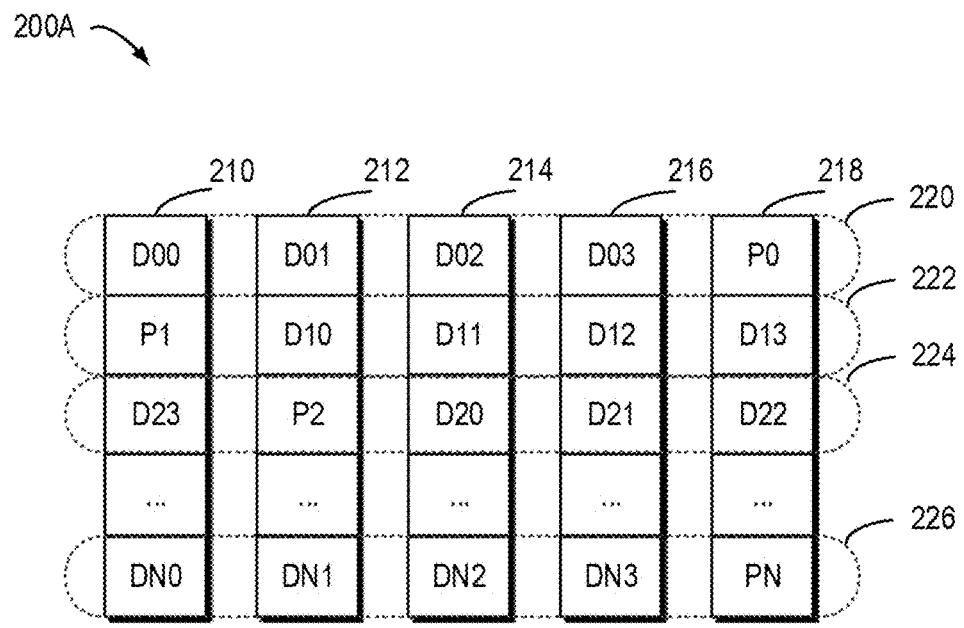
FIG. 2A schematically shows a schematic diagram of a storage system in which a method of the present disclosure may be implemented.

FIG. 2A schematically shows a schematic diagram of storage system 200A in which a method of the present disclosure may be implemented. In the storage system shown in FIG. 2A, a RAID-5 (4D+1P, where 4D represents that a storage system includes four storage devices for storing data, and 1P represents that the storage system includes one storage device for storing a P parity) array including five independent storage devices (210, 212, 214, 216, and 218) is used as an example to illustrate the working principle of RAID. It should be noted that although seven storage devices are schematically shown in FIG. 1B, more or fewer storage devices may also be included in other implementations depending on different RAID levels.

In a RAID, an RE may span a plurality of physical storage devices (for example, RE 220 spans storage devices 210, 212, 214, 216, and 218). The RE may be simply understood as a storage region that meets a certain address range in the plurality of storage devices. Data stored in RE 220 includes a plurality of parts: data block D00 stored on storage device 210, data block D01 stored on storage device 212, data block D02 stored on storage device 214, data block D03 stored on storage device 216, and data block P0 stored on storage device 218. In this example, data blocks D00, D01, D02, and D03 are stored data, while data block P0 is the P parity of the stored data.

The manner in which data is stored in other RE 222 and RE 224 is also similar to that for RE 220, except that parities related to other data blocks may be stored on a storage device different from storage device 218. In this way, when one of a plurality of storage devices 210, 212, 214, 216, and 218 fails, data in the failed device may be recovered from other normal storage devices.

Figure 2B:
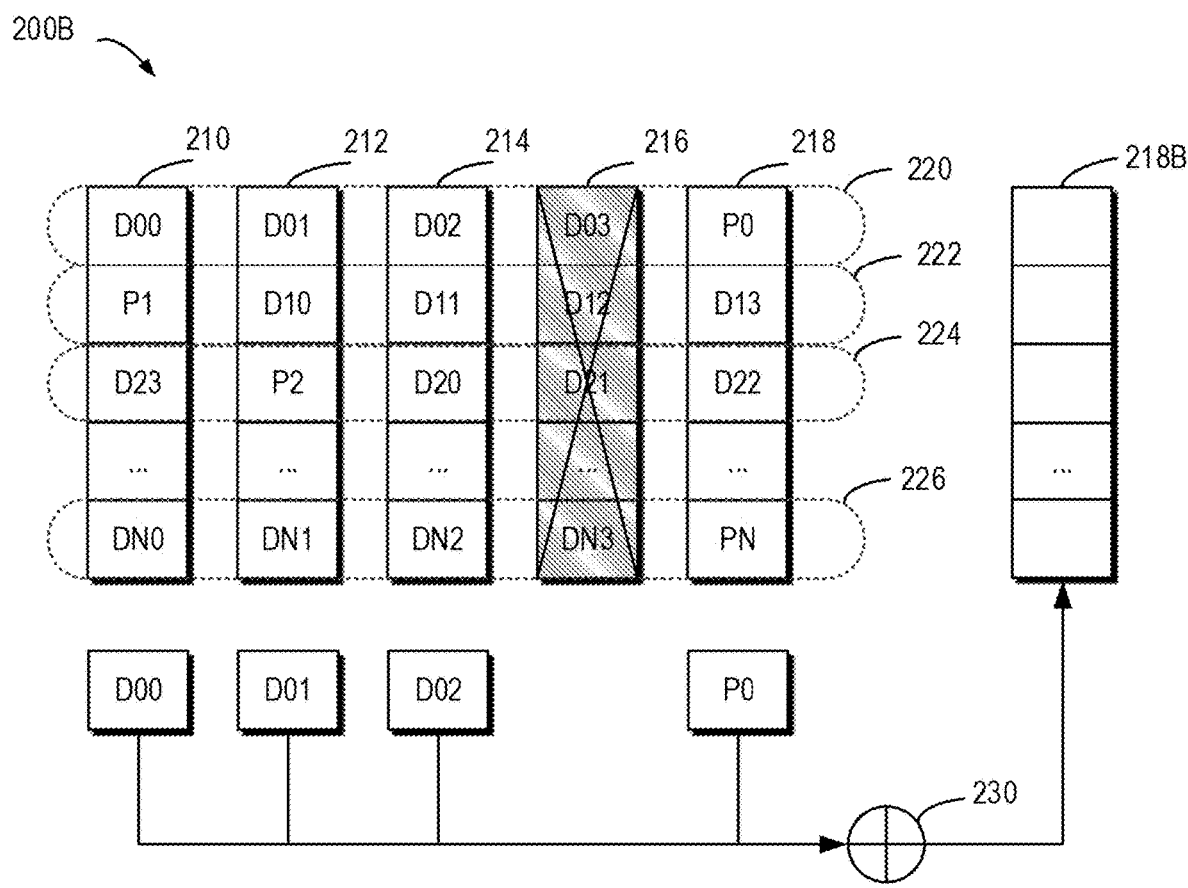
FIG. 2B schematically shows a schematic diagram of a reconstruction process of a storage system.

FIG. 2B schematically shows schematic diagram 200B of a reconstruction process of storage system 200A. As shown in FIG. 2B, when one storage device (for example, storage device 216 shown in shadow) fails, data may be recovered from a plurality of remaining storage devices 210, 212, 214, and 218 that operate normally. In this case, new backup storage device 218B may be added into the RAID to replace storage device 216. In this way, the recovered data may be written to 118B and the system may be reconstructed. For example, the data of data blocks D00, D01, D02, and D03 and P0 may be calculated at block 203 to recover the data of data block D03 on storage device 218, and the data is written to backup storage device 218B.

It should be noted that although a RAID-5 storage system including five storage devices (wherein four storage devices are used for storing data and one storage device is used for storing the parity) is described above with reference to FIG. 2A and FIG. 2B, according to definitions of other RAID levels, there may also be storage systems that include other numbers of storage devices. For example, based on the definition of RAID-6, two storage devices may be used for storing parities P and Q respectively. For another example, based on the definition of triple-parity RAID, three storage devices may be used for storing parities P, Q, and R respectively.

With the development of distributed storage technologies, storage devices 210, 212, 214, 216, and 218 in the storage system shown in FIG. 2A and FIG. 2B may no longer be limited to physical storage devices, but may be virtual storage devices. For example, extents on storage device 210 may respectively come from different physical storage devices (simply referred to as storage devices hereinafter) in a resource pool.

FIG. 3A schematically shows a schematic diagram of neighbor matrix 300A according to an example implementation of the present disclosure. Considering factors such as the high performance of parallel I/O processing and the desirable performance of data reconstruction, uniform distribution is one of first principles of disk extent allocation. In order to evaluate the distribution uniformity of disk extents, a Neighbor Matrix (NM) may be used for representing them. The neighbor matrix is an n*n square matrix, where n is the number of disks in a storage resource pool. Each element in the matrix NM may be expressed as NM(i,j), and the element represents the number of times disk i neighbors disk j. According to the definition of NM, all disk extents in one RAID extent belong to disks neighboring one another. The neighbor matrix is a symmetric matrix with a diagonal of 0s. Because according to the definition of "neighbor," in a case of i≠j, a value of NM(i,j) should be equal to a value of NM(j,i), while in a case of i=j. NM(i,j) is always zero.

Specifically, a neighbor matrix shown in FIG. 3A involves 10 disks, so the neighbor matrix is a square matrix of 10×10, where each value in the matrix represents the number of times disk extents of two disks i and j are in the same RAID extent. If the disk extents used by the RAID are evenly distributed on all disks in the storage resource pool, values in the neighbor matrix other than the values at the diagonal should be basically approximate to one another. Therefore, whether the disk extents are evenly distributed may be evaluated by observing differences between the values of the neighbor matrix.

Figure 3B:
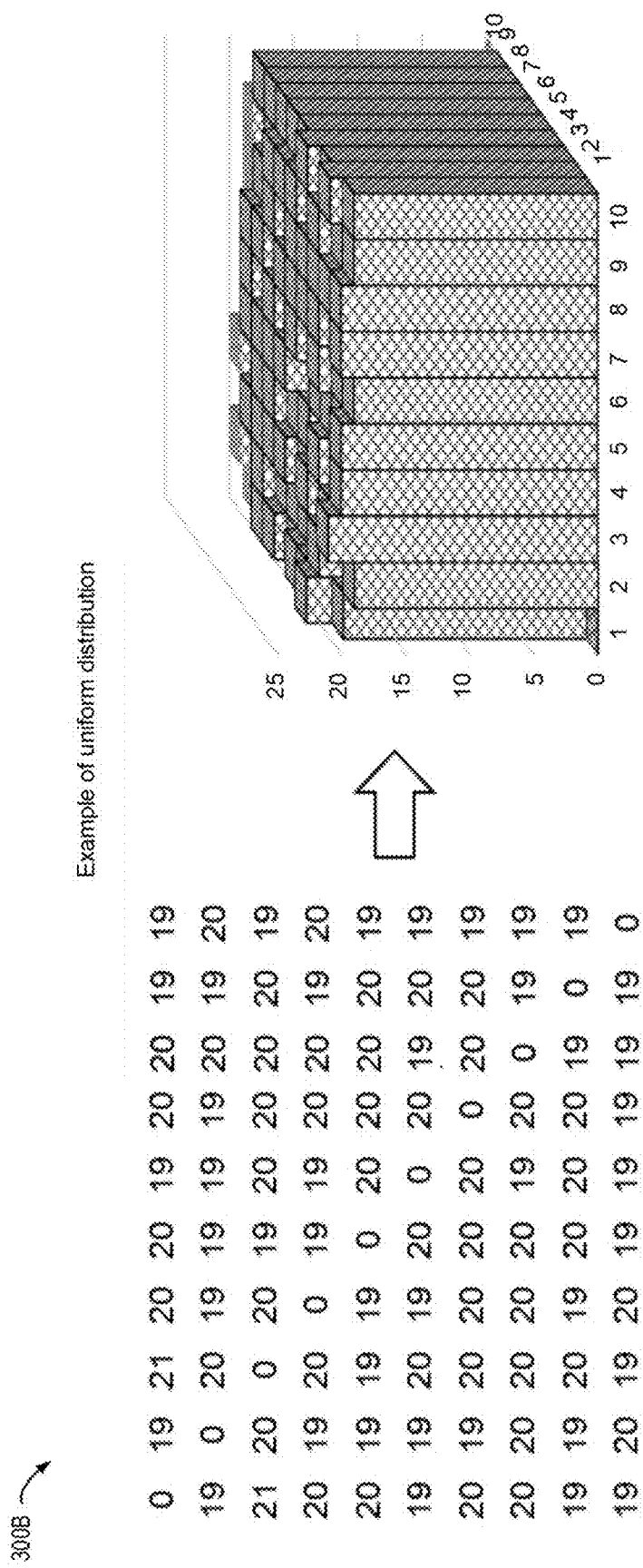
FIG. 3B schematically shows a schematic diagram of a scenario of uniform distribution of disk extents and a corresponding neighbor matrix.
Figure 3C:
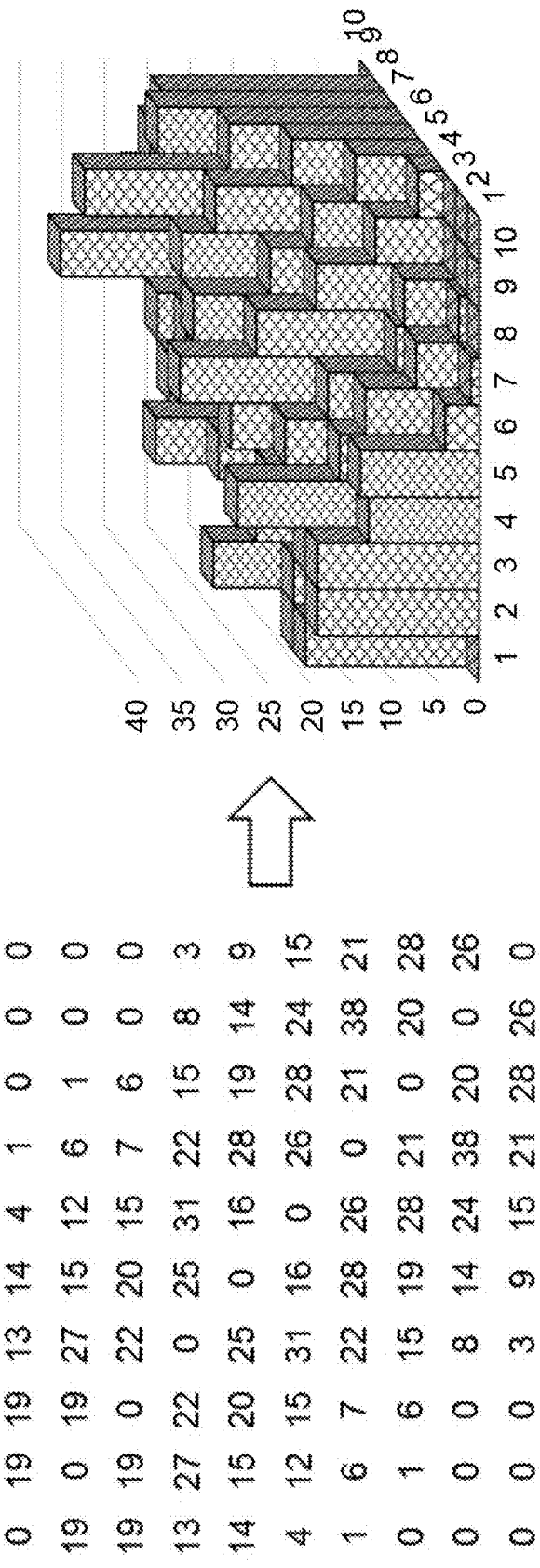
FIG. 3C schematically shows a scenario of non-uniform distribution of disk extents and a corresponding neighbor matrix.

FIG. 3B schematically shows a schematic diagram of a scenario of uniform distribution of disk extents and corresponding neighbor matrix 300B. FIG. 3C schematically shows a schematic diagram of a scenario of non-uniform distribution of disk extents and corresponding neighbor matrix 300C. As can be seen from FIG. 3B, the disk extents are basically evenly distributed on various disks. In the corresponding neighbor matrix, the numbers of times of the disks neighboring each other are basically 19 and 20. In contrast, in FIG. 3C, the situation of disk extents between various disks is quite different, and they are not uniformly distributed. In the corresponding neighbor matrix, the numbers of times of some disks neighboring each other is up to 38, while the numbers of times of some disks neighboring each other is as low as 1, or even 0.

As mentioned earlier, in the case of non-uniform distribution of disk extents, disk extent reallocation may be performed through a shuffling operation. The shuffling operation functions to balance the distribution of disk extents in the storage resource pool by reallocating the disk extents in disks with high values in the neighbor matrix. For the purpose of illustration, the process of the existing shuffling operation will be briefly described with reference to FIG. 4.

Figure 4:
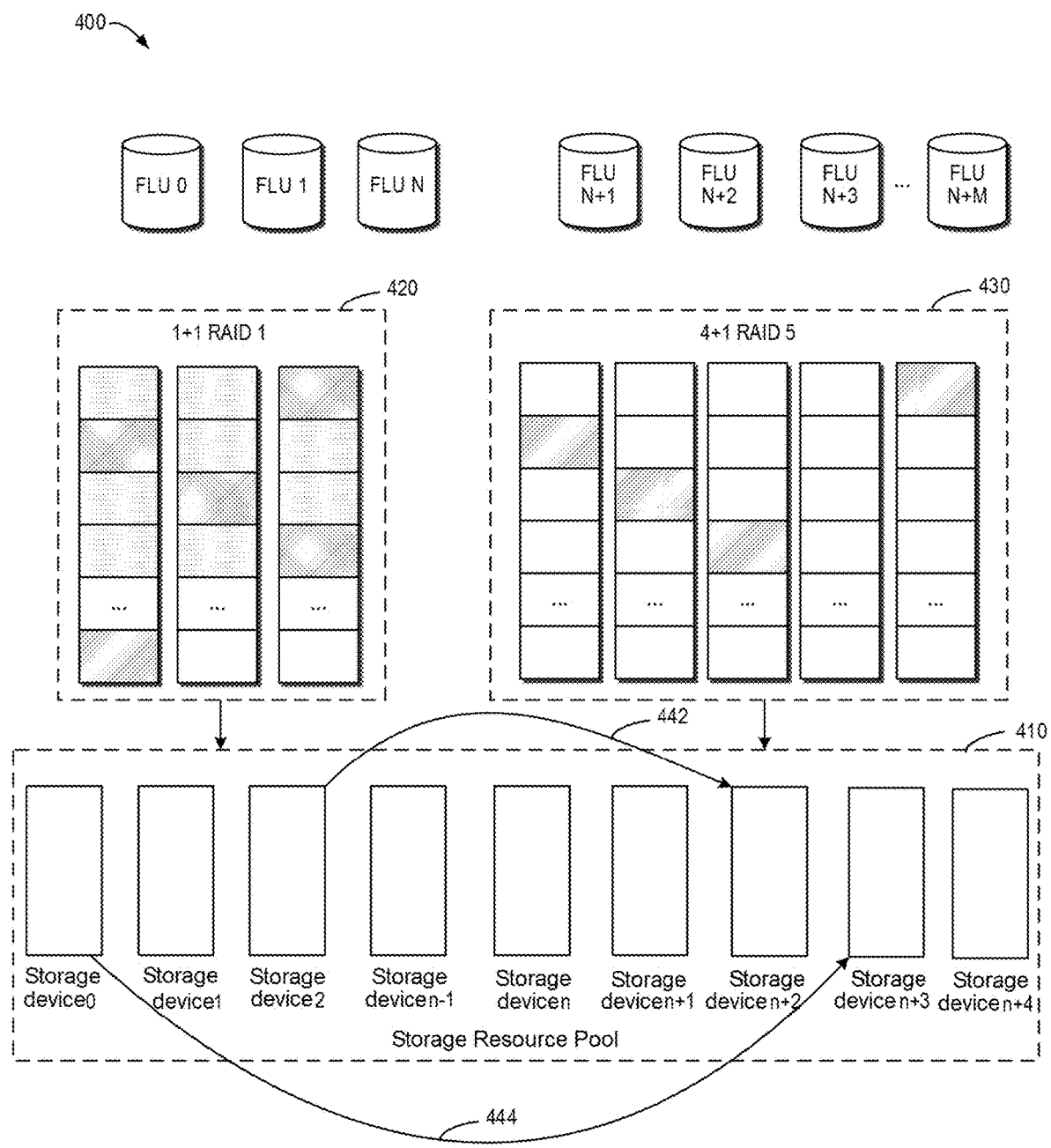
FIG. 4 schematically shows a schematic diagram of performing shuffling according to an example implementation of the present disclosure.

FIG. 4 schematically shows a schematic diagram of performing shuffling 400 according to an example implementation of the present disclosure. For storage resource pool 410 containing n disks (d1, d2, . . . , dn), disks i and j corresponding to element NM(i,j) with the maximum value in the corresponding neighbor matrix are usually selected first. If there are a plurality of maximum values, one may be selected randomly. Then, the following RE set is searched for in REs. Each element RE in the RE set includes both disk extents of disk i and disk extents of disk j. Or, in other words, in the RE, there is a disk extent of disk i in one location and a disk extent of disk j in the other location. Then, for each RE in the RE set, a candidate target disk k is searched for. A sum of NM(k,x) of the candidate target disk k should be less than a sum of NM(i,x) or a sum of NM(j,x), where x is a serial number of a disk except i, j, and k in the RE. This means that the target disk needs to be able to improve the uniformity of disk extent distribution. In addition, for each RE, an extent movement from source disk i or j to candidate target disk k is recorded as an effective movement. If no candidate target disk is found, the shuffling operation ends. If there is a candidate target disk, an effective disk extent that can make the greatest performance improvement is determined from a corresponding effective disk extent movement. Then, the disk extent in the RE may be moved from the source disk to the target disk according to a final determination result. For example, it is moved from storage device 0 to storage device n+3 (arrow 442), and moved from storage device 2 to storage device n+2 (arrow 444).

Figure 5A:
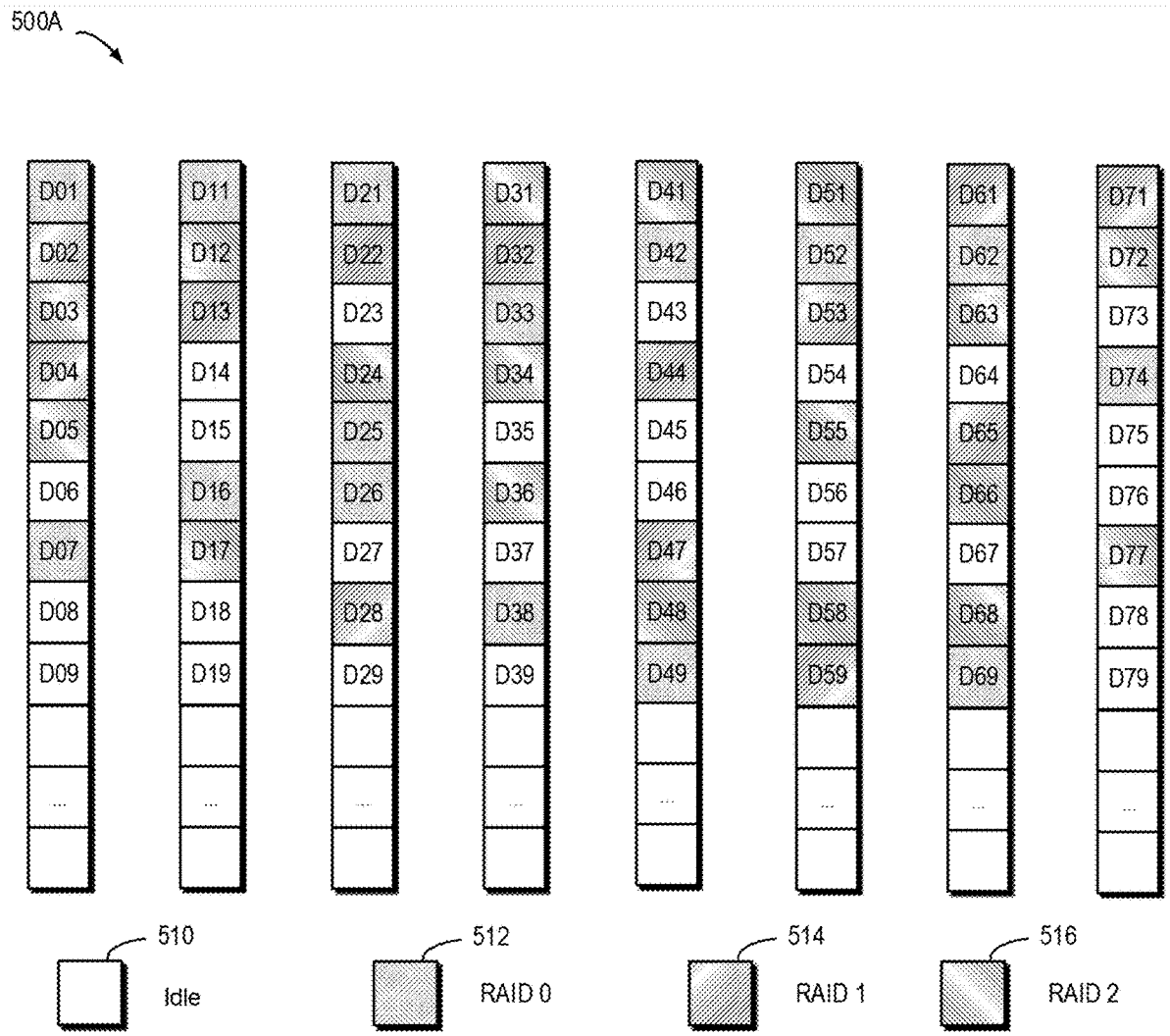
FIG. 5A schematically shows a schematic diagram of a global RE distribution according to an example implementation of the present disclosure.

FIG. 5A schematically shows a schematic diagram of global RE distribution 500A according to an example implementation of the present disclosure. As shown in FIG. 5A, legend 510 represents an idle DE, legend 512 represents a DE with a serial number of RAID 0, legend 514 represents a DE with a serial number of RAID 1, and legend 516 represents a DE with a serial number of RAID 2.

Figure 5B:
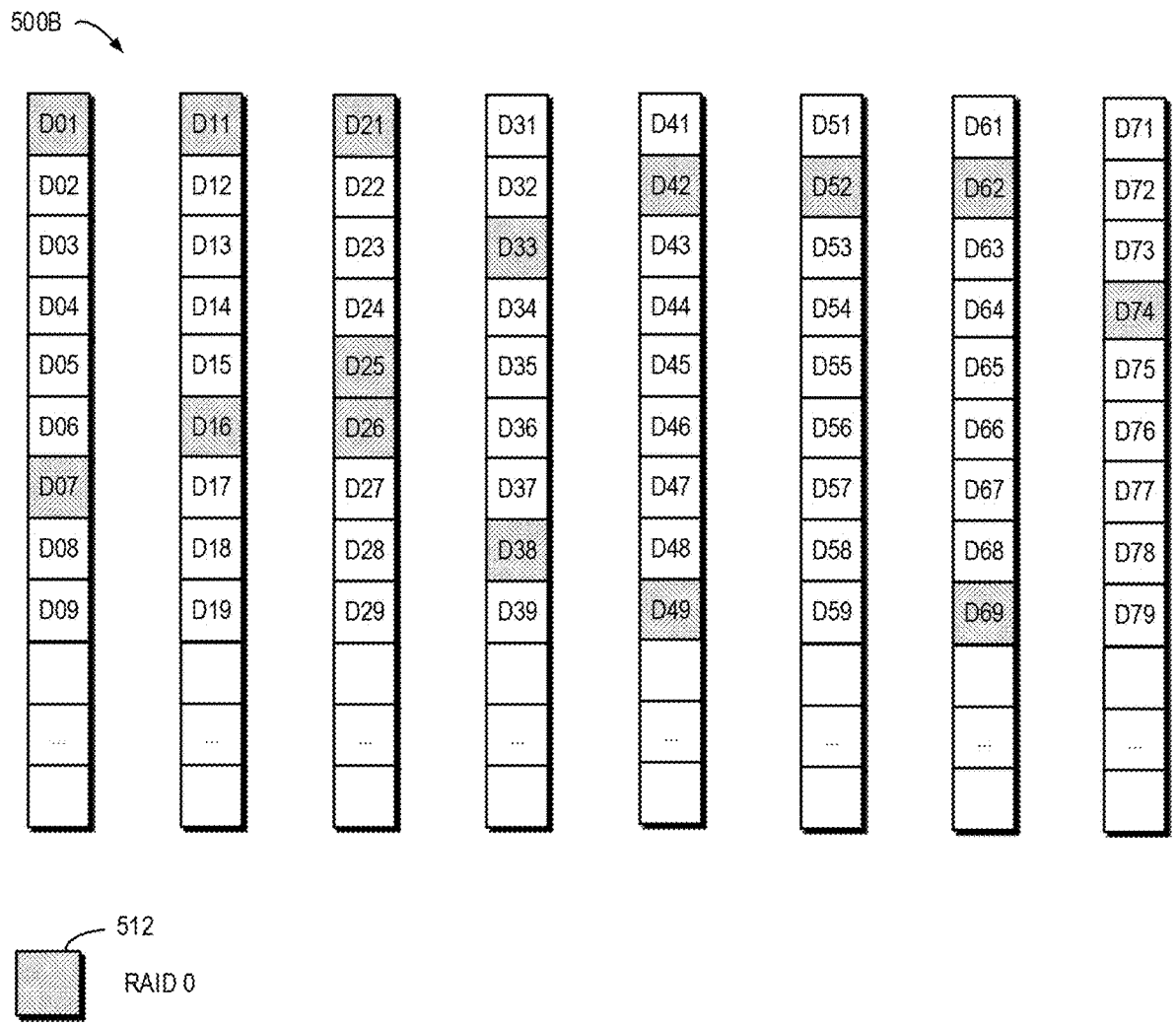
FIG. 5B schematically shows a schematic diagram of a specific RE distribution according to an example implementation of the present disclosure.

FIG. 5B schematically shows a schematic diagram of specific RE distribution 500B according to an example implementation of the present disclosure. As shown in FIG. 5B, legend 512 indicates a DE with a serial number of RAID 0, and other DEs are not shown whether they have been used for a RAID. In fact, a local neighbor matrix only for a specific RAID (for example, RAID 0) may be calculated. As an example, when calculating the local neighbor matrix for RAID 0, other DEs may be considered to be idle.

Figures 6A, 6B:
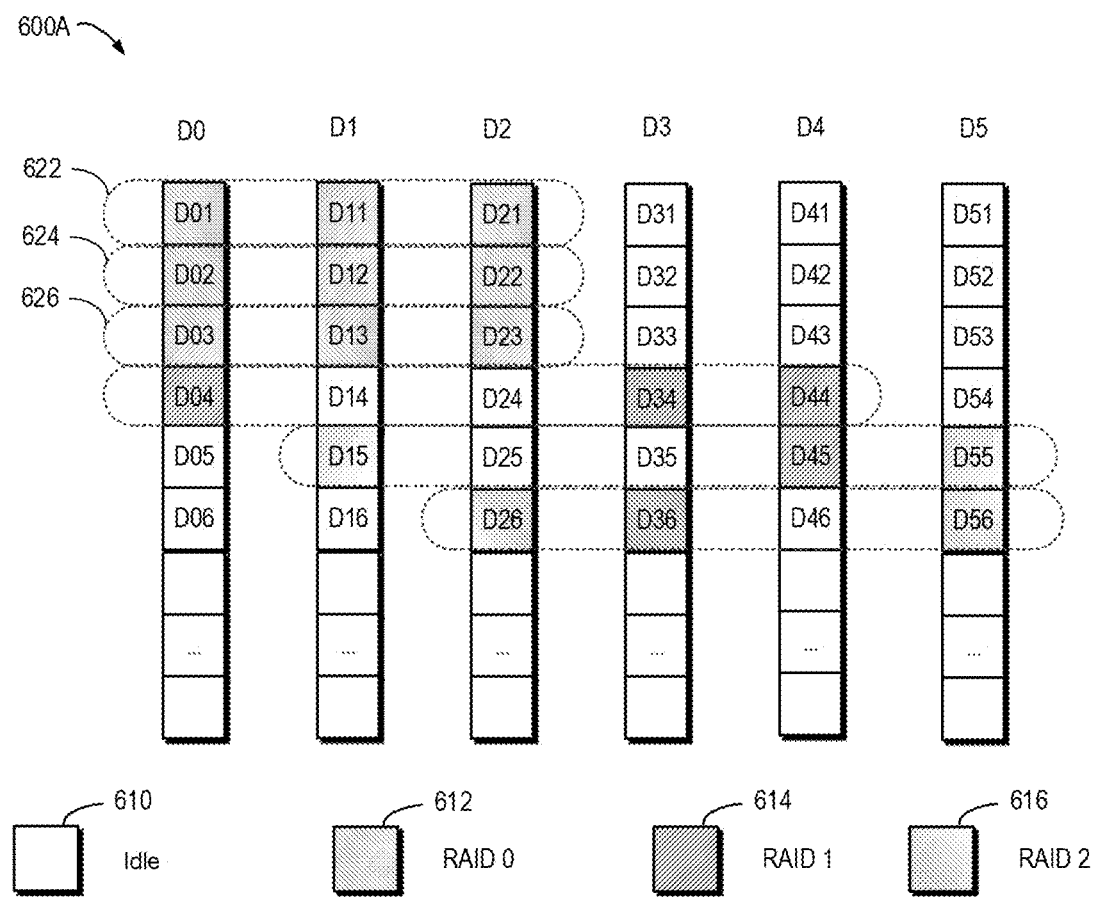
FIG. 6A schematically shows a schematic diagram of local congestion according to an example implementation of the present disclosure.
FIG. 6B schematically shows a schematic diagram of a local neighbor matrix for a specific RAID according to an example implementation of the present disclosure.

FIG. 6A schematically shows a schematic diagram of local congestion 600A according to an example implementation of the present disclosure. As shown in FIG. 6A, RE 622, RE 624, and RE 626 have local congestion, and are concentrated on three storage devices. For example, D01 belonging to RE 622, D02 belonging to RE 624, and D03 belonging to RE 626 are concentrated on storage device D0. D11 belonging to RE 622, D12 belonging to RE 624, and D13 belonging to RE 626 are concentrated on storage device D1. Such local congestion is not conducive to the I/O performance and fault reconstruction.

FIG. 6B schematically shows a schematic diagram of local neighbor matrix 600B for a specific RAID according to an example implementation of the present disclosure. Local neighbor matrix 600B shown in FIG. 6B reflects the local congestion situation shown in FIG. 6A. As can be seen, even when a global neighbor matrix is in good condition, congestion may still exist only for a local part of a specific RAID. For example, the number of times of D0, which represents a first column of storage device, neighboring D1, which represents a second column of storage device, is up to 4, while the number of times of D2, which represents a third column of storage device, neighboring D0, which represents the first column of storage device, is up to 5.

Figure 7:
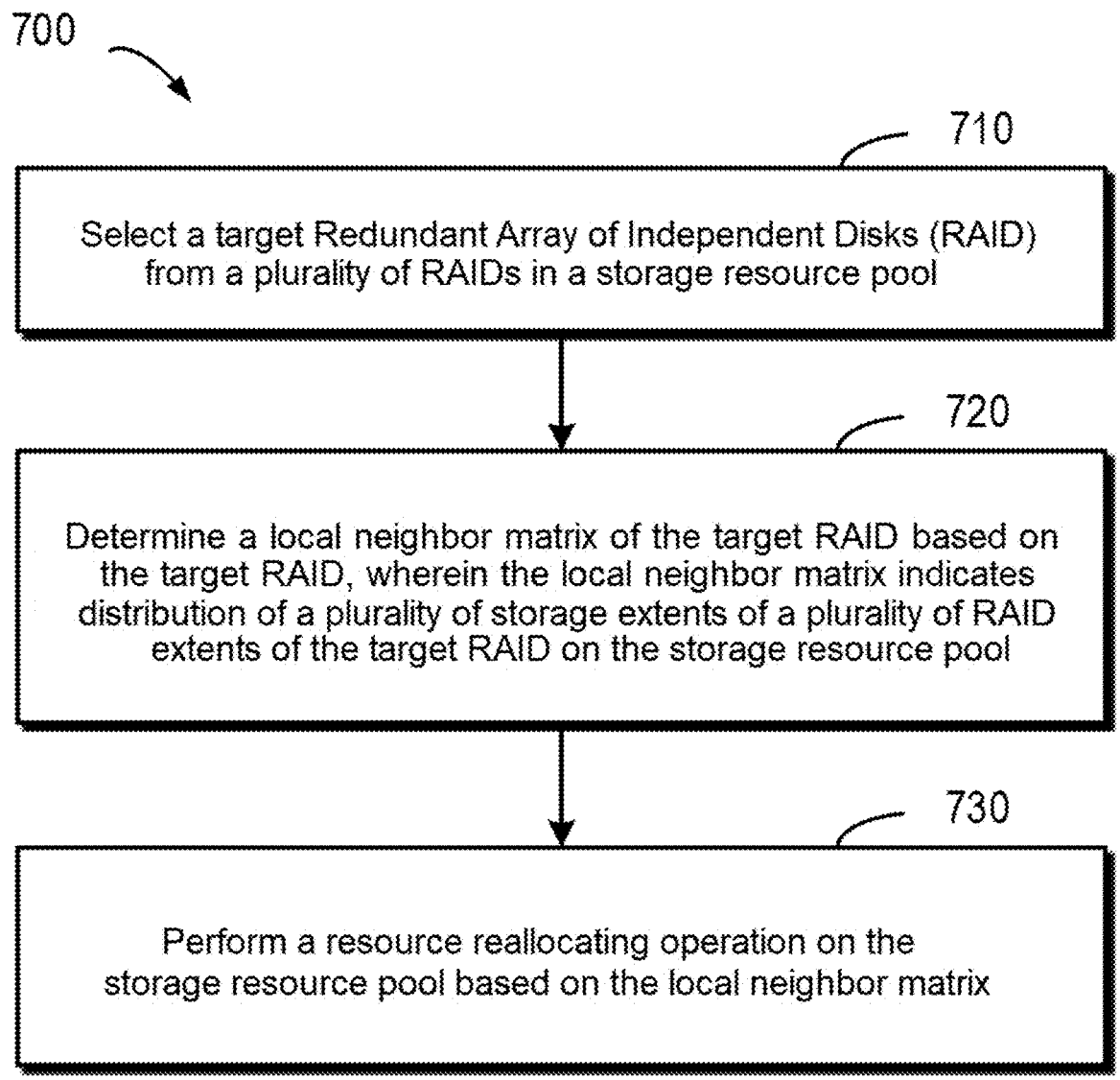
FIG. 7 schematically shows a flow chart of a method for data storage according to an example implementation of the present disclosure.
Figure 8A:
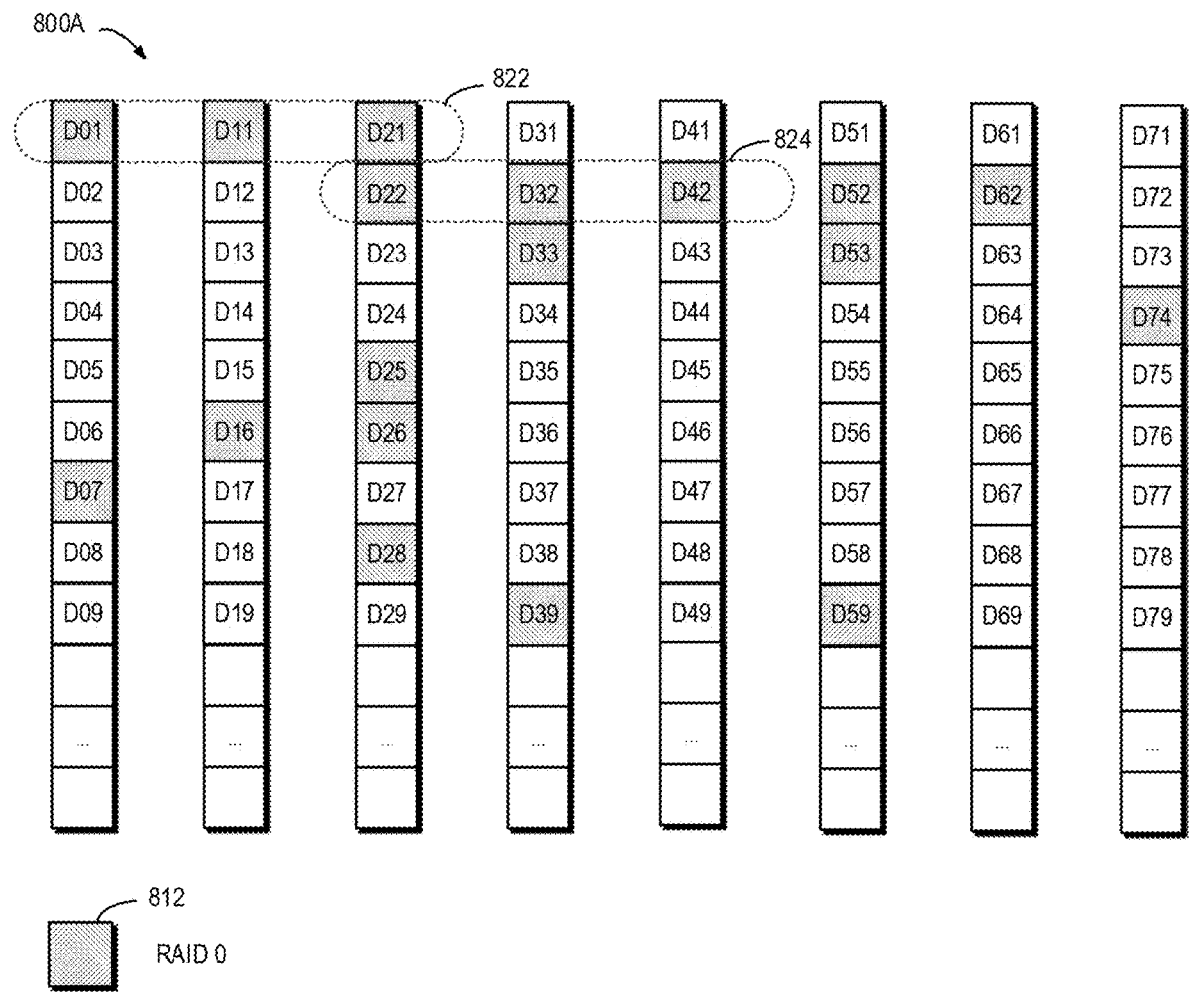
FIG. 8A schematically shows a schematic diagram of an RE distribution for a specific RAID according to an example implementation of the present disclosure.

FIG. 7 schematically shows a flow chart of method 700 for data storage according to an example implementation of the present disclosure. FIG. 8A schematically shows a schematic diagram of RE distribution 800A for a specific RAID according to an example implementation of the present disclosure. FIG. 8B to FIG. 8D schematically show schematic diagrams of processes for determining local neighbor matrices 800B, 800C, and 800D for a specific RAID according to an example implementation of the present disclosure. FIG. 9A schematically shows a schematic diagram of iteration process 900A of determining whether a specific RAID has local congestion according to an example implementation of the present disclosure. FIG. 9B schematically shows a schematic diagram of optimized local neighbor matrix 900B for a specific RAID according to an example implementation of the present disclosure. Method 700 for data storage and detailed examples of the present disclosure will be described below with reference to FIG. 7 to FIG. 9B.

At block 710, a target RAID is selected from a plurality of redundant array of independent disks (RAID) in a storage resource pool. For example, in the storage resource pool shown in FIG. 8A, RAID 0 represented by legend 812 is selected as the target RAID. As can be seen, RAID 0 includes RE 822 and RE 824, as well as other REs without serial numbers.

In some embodiments, all RAIDs in the storage resource pool may be sorted according to a certain rule to form a RAID sequence. In some embodiments, sorting may be performed in descending order according to the number of REs included in a RAID. For example, if RAID 0 includes 100 REs, RAID 1 includes 50 REs, RAID 2 includes 80 REs, and RAID 5 includes 10 REs, sorting may be performed in an order of RAID 0, RAID2, RAID 1, and RAID 5.

At block 720, a local neighbor matrix of the target RAID is determined based on the target RAID, where the local neighbor matrix indicates distribution of a plurality of storage extents of a plurality of RAID extents of the target RAID on the storage resource pool. As an example, the local neighbor matrix may be determined based on RAID 0. The local neighbor matrix indicates the distribution uniformity of DEs, such as D01, D11, and D21, represented by legend 812 on the storage resource pool, as shown in FIG. 8A.

In some embodiments, a local neighbor matrix mechanism may be applied to a target storage array to balance the distribution uniformity of the RAID. In some embodiments, the local neighbor matrix may be calculated step by step. For example, for RE 822, a local neighbor matrix shown in FIG. 8B is determined first. Then, for RE 824, a local neighbor matrix as shown in FIG. 8C is determined. Then, a local neighbor matrix for an RE composed of D52, D62, and D74 is determined, as shown in FIG. 8D. And so on, a local neighbor matrix for each RE may be determined, and then these local neighbor matrices are added to obtain the local neighbor matrix for the target RE. For the convenience of description, the step-by-step calculation method is also referred to as the local neighbor matrix mechanism.

In some embodiments, an iteration step size may be selected to traverse all REs to determine whether there is local congestion. The step size is obtained by dividing the width of the storage resource pool by the width of the RE and rounding off. Then, the neighbor matrix of the selected RE group, which is referred to as the local neighbor matrix, is iteratively calculated. The number in selected RE groups is an integral multiple of the step size.

For example, taking the storage resource pool width of 8 (there are 8 disks in the storage resource pool) and the RAID width of 3 as an example, a step size of 3 may be selected to iteratively calculate the local neighbor matrix. That is, the RE number may be selected as an integral multiple of 3 (in the first round, 3 REs form a group; in the second round, 6 REs form a group; in the third round, 9 REs form a group, and so on).

As can be seen from FIG. 9A, in the first round, a set of RE groups is selected as [(RE0, RE 1, RE 2), (RE 1, RE 2, RE 3), (RE 2, RE3, RE 4) . . . ], a local neighbor matrix is calculated, and whether there is local congestion is determined. Then, in the second round, a set of RE groups is selected as [(RE0, RE1, RE 2, RE 3, RE 4, RE 5), (RE 1, RE 2, RE 3, RE 4, RE 5, RE 6)], a local neighbor matrix is calculated, and whether there is local congestion is determined, and so on.

At block 730, a resource reallocation operation is performed on the storage resource pool based on the local neighbor matrix. For example, when the local neighbor matrix indicates that there is local congestion, the storage resource pool may be shuffled to balance the distribution uniformity of storage extents on the storage resource pool.

In some embodiments, the local neighbor matrix may be optimized, and the storage resource pool may be shuffled to achieve an optimized local neighbor matrix. Local neighbor matrix 900B as shown in FIG. 9B is the optimized local neighbor matrix for the target RAID.

Method 700 introduces a new method for judging global balance and local balance of a matrix, which can eliminate the potential internal imbalance in the global neighbor matrix and provide the ability to handle the relationship between the local neighbor matrix and the global neighbor matrix.

In a conventional design, the storage resource pool maintains a global neighbor matrix to record neighboring relationships of all REs, which is equivalent to treating the storage resource pool as a large RAID. By using method 700, the granularity of the neighbor matrix is reduced to a separate RAID level, so that method 700 is more refined and can solve the performance degradation caused by local non-uniformity in the conventional neighbor matrix, and reduce the opportunity for user IOs to concentrate on a hot disk, thereby being capable of ensuring that the neighbor matrix of the entire storage resource pool is balanced as a whole.

Figure 10:
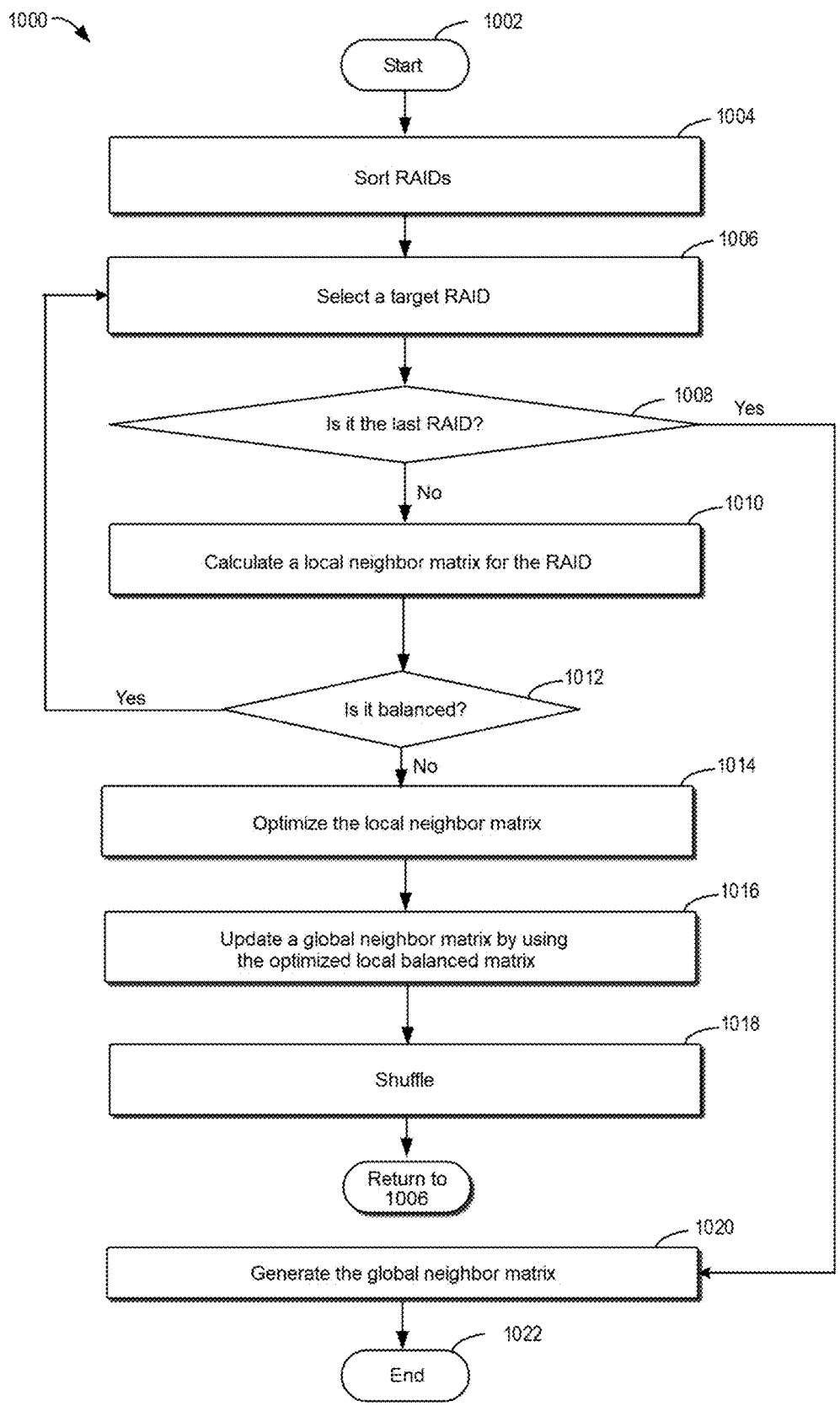
FIG. 10 schematically shows a schematic diagram of a process of optimizing a global neighbor matrix according to an example implementation of the present disclosure.
Figure 11A:
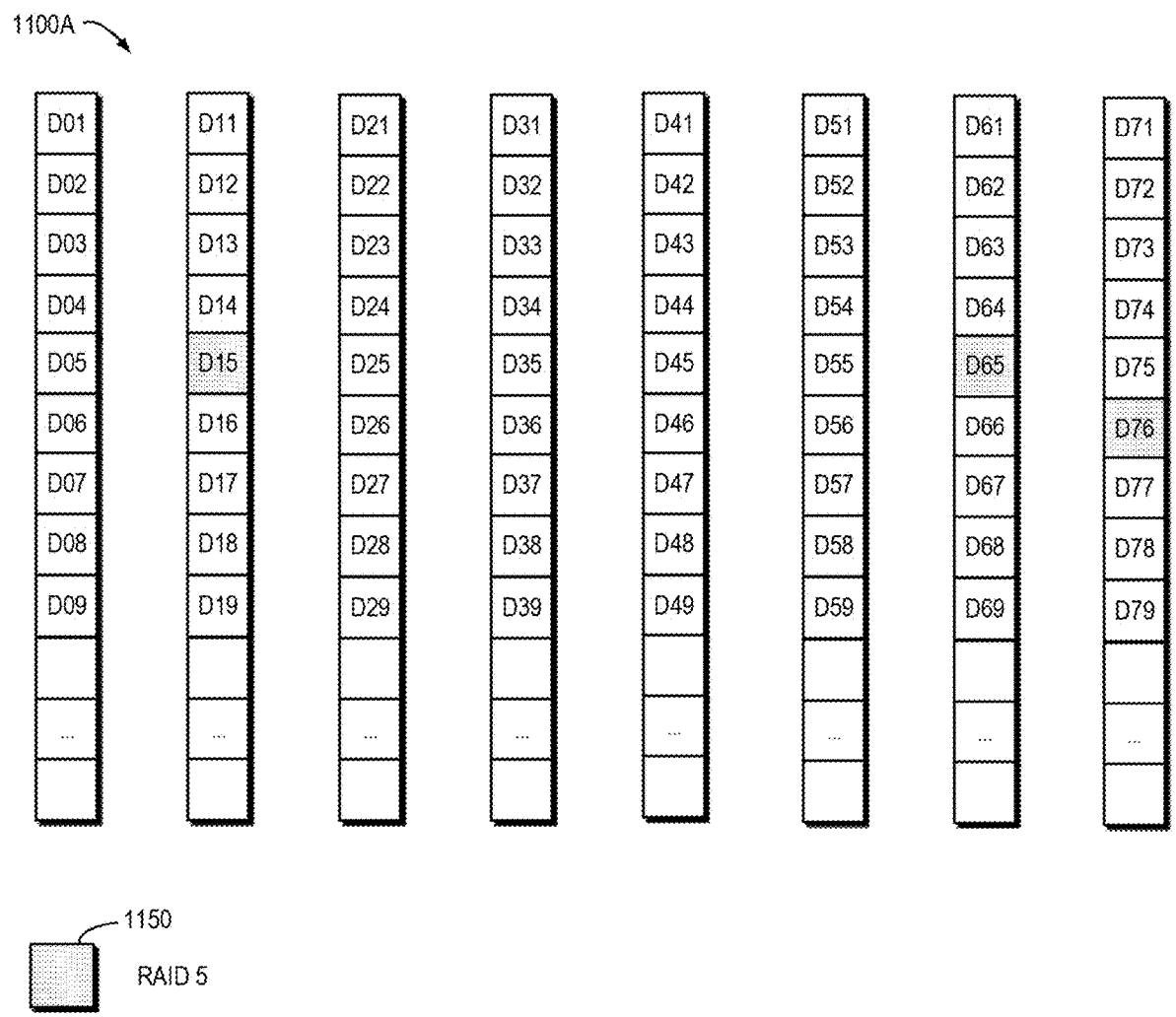
FIG. 11A schematically shows a schematic diagram of an RE distribution of another specific RAID according to an example implementation of the present disclosure.
Figures 11B, 12:
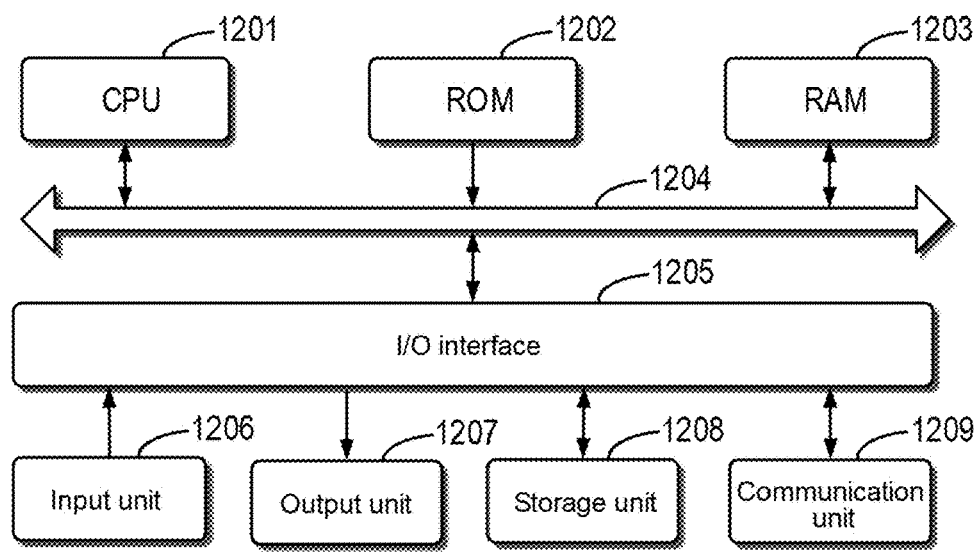
FIG. 11B schematically shows a schematic diagram of an optimized local neighbor matrix for another specific RAID according to an example implementation of the present disclosure.
FIG. 12 schematically shows a block diagram of a device for data storage according to an example implementation of the present disclosure.

In some embodiments, after local optimization and balancing is performed for the target RAID, another RAID may further be selected for local balancing and optimization. For example, RAID 2 (having the second largest number of REs) is selected to continue the local balancing and optimization. FIG. 10 schematically shows a schematic diagram of process 1000 of optimizing a global neighbor matrix according to an example implementation of the present disclosure. FIG. 11A schematically shows a schematic diagram of RE distribution 1100A of another specific RAID according to an example implementation of the present disclosure. FIG. 11B schematically shows a schematic diagram of optimized local neighbor matrix 1100B for another specific RAID according to an example implementation of the present disclosure. Process 1000 will be described below with reference to FIG. 10 to FIG. 11B.

At block 1002, process 1000 starts. At block 1004, the RAIDs are sorted. Sorting may be performed in descending order according to the number of REs included in a RAID. At block 1006, a RAID with the highest ranking among the RAIDs is selected first, and after the selected RAID is balanced, a RAID with the second ranking is then selected, and so on. At block 1008, it is judged whether the currently selected RAID is the last RAID in the storage resource pool or a pending RAID extent pool. If the current RAID is not the last one, the process proceeds to block 1010. If the current RAID is the last one, the process proceeds to block 1020.

At block 1010, a local neighbor matrix is calculated for the current RAID. At block 1012, it is judged, based on the local neighbor matrix, whether there is local congestion or whether it is balanced. If it is unbalanced, the process proceeds to block 1014. If it is balanced, the process returns to block 1006. At this point, at block 1006, a new RAID with fewer REs will be selected.

At block 1014, the local neighbor matrix of the current RAID is optimized. At block 1016, a global neighbor matrix is updated with the optimized local neighbor matrix. In some embodiments, an initialized global neighbor matrix may be established, but it may not be completely filled with data, and it may be used for storing intermediate variables. For example, a global neighbor matrix with the local neighbor matrix as an initial value is established. The global neighbor matrix is updated based on the optimized local neighbor matrix. For example, the optimized local neighbor matrix is added to the previous initialized matrix for storing intermediate variables, and a result of the addition is assigned to the global neighbor matrix.

At block 1018, a shuffling operation is performed on the storage resource pool to balance the distribution of its storage extents. In some embodiments, an unoptimized storage array extent is first shuffled. If no unoptimized storage array extent exists, an optimized storage array extent is then reshuffled. The advantage of this is to try not to affect a neighbor matrix that has reached the balanced state before, and not to affect the optimization that has been completed after. For example, further optimization of the local neighbor matrix of RAID 5 shown in FIG. 11B tries not to move the DEs of RAID 0 that have been optimized before.

In some embodiments, if a bottleneck is encountered, the RE of good-balanced RAID may be moved, and the RE of the last optimized RAID may be tried to move, and process 1000 may be run again. After the completion of block 1018, the process returns to block 1006, a new RAID with fewer REs is selected, and it is determined whether it is the last RAID. At block 1020, in response to the fact that the current RAID is the last RAID (for example, RAID 5 in FIG. 11A) and there is no local congestion, a global neighbor matrix may be generated based on the storage resource pool of the current RAID. If RAID 5 also has local congestion, it may be optimized and balanced, and then the global neighbor matrix may be generated. At block 1022, process 1000 ends.

Through process 1000 of iteration, the process of balancing and optimizing the neighbor matrix of the entire storage resource pool can be optimized with individual RAID as the granularity. Process 1000 can better distribute all REs among all disks in the storage resource pool to improve the IO performance.

FIG. 12 shows a schematic block diagram of device 1200 that may be used for implementing embodiments of the present disclosure. Device 1200 may be a device or an apparatus described in the embodiments of the present disclosure. As shown in FIG. 12, device 1200 includes central processing unit (CPU) 1201 that may perform various appropriate actions and processing according to computer program instructions stored in read-only memory (ROM) 1202 or computer program instructions loaded from storage unit 608 into random access memory (RAM) 1203. Various programs and data required for the operation of device 1200 may also be stored in RAM 1203. CPU 1201, ROM 1202, and RAM 1203 are connected to each other through bus 1204. Input/output (I/O) interface 1205 is also connected to bus 1204. Although not shown in FIG. 12, device 1200 may also include a co-processor.

A plurality of components in device 1200 are connected to I/O interface 1205, including: input unit 1206, such as a keyboard and a mouse; output unit 1207, such as various types of displays and speakers; storage unit 1208, such as a magnetic disk and an optical disc; and communication unit 1209, such as a network card, a modem, and a wireless communication transceiver. Communication unit 1209 allows device 1200 to exchange information/data with other devices over a computer network such as the Internet and/or various telecommunication networks.

The various methods or processes described above may be performed by CPU 1201. For example, in some embodiments, the method may be implemented as a computer software program that is tangibly included in a machine-readable medium, such as storage unit 1208. In some embodiments, part or all of the computer program may be loaded and/or installed onto device 1200 via ROM 1202 and/or communication unit 1209. When the computer program is loaded into RAM 1203 and executed by CPU 1201, one or a plurality of steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instruction described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for data storage, comprising:
   selecting a target Redundant Array of Independent Disks (RAID) from a plurality of RAIDs in a storage resource pool;
   determining a local neighbor matrix of the target RAID based on the target RAID, wherein the local neighbor matrix indicates distribution of a plurality of storage extents of a plurality of RAID extents of the target RAID on the storage resource pool; and
   performing a resource reallocating operation on the storage resource pool based on the local neighbor matrix;
   wherein determining a local neighbor matrix of the target RAID based on the target RAID comprises:
   determining an iteration step size based on a width of the storage resource pool and a width of the RAID extent;
   determining, for the target RAID, a set comprising a plurality of RAID extent groups, wherein the number of RAID extents in each RAID extent group of the plurality of RAID extent groups is equal to the iteration step size; and
   traversing the set to determine the local neighbor matrix.

2. The method according to claim 1, wherein performing a resource reallocating operation on the storage resource pool based on the local neighbor matrix comprises:
   determining whether the target RAID has local congestion based on the local neighbor matrix; and
   shuffling, in response to a determination that the target RAID has local congestion, the storage resource pool to optimize the distribution.

3. The method according to claim 2, wherein the set is a first set, and determining whether the target RAID has local congestion based on the local neighbor matrix comprises:
   determining, for the target RAID, a second set comprising a plurality of RAID extent groups, wherein the number of RAID extents in each of the plurality of RAID extent groups of the second set is an integral multiple of the iteration step size;
   traversing the second set to determine the local neighbor matrix; and
   determining, based on the local neighbor matrix, whether the target RAID has local congestion.

4. The method according to claim 2, wherein performing a data shuffling operation on the storage resource pool in response to a determination that the target RAID has local congestion comprises:
   optimizing the local neighbor matrix to improve uniformity of the distribution; and
   shuffling the storage resource pool based on the optimized local neighbor matrix.

5. The method according to claim 4, further comprising:
   determining a global neighbor matrix with the local neighbor matrix as an initial value, wherein the global neighbor matrix indicates distribution of storage extents of RAID extents of all RAIDs in the storage resource pool on the storage resource pool; and
   updating the global neighbor matrix based on the optimized local neighbor matrix.

6. The method according to claim 5, wherein the target RAID extent is a first RAID extent, the local neighbor matrix is a first local neighbor matrix, and the method further comprises:
   selecting a second RAID from the plurality of RAID of the storage resource pool, wherein the number of RAID extents of the second RAID is less than that of the first RAID;
   determining a second local neighbor matrix based on the second RAID;
   determine, based on the second local neighbor matrix, whether the second RAID has local congestion;
   optimizing the second local neighbor matrix in response to a determination that the second RAID has local congestion;
   shuffling the shuffled storage resource pool based on the optimized second local neighbor matrix; and
   updating the global neighbor matrix based on the optimized second local neighbor matrix.

7. The method according to claim 6, wherein shuffling the shuffled storage resource pool based on the optimized second local neighbor matrix comprises:
   shuffling an unoptimized RAID extent; and
   shuffling an optimized RAID extent in response to that the unoptimized RAID extent does not exist.

8. The method according to claim 6, further comprising:
   determining whether the second RAID is the last RAID in the storage resource pool;
   determining, in response to a determination that the second RAID is the last RAID in the storage resource pool, the global neighbor matrix based on the shuffled storage resource pool; and
   selecting, in response to that the second RAID is not the last RAID in the storage resource pool, a third RAID in the storage resource pool, wherein the number of RAID extents of the third RAID is less than that of the second RAID.

9. The method according to claim 1, wherein selecting the target RAID from a plurality of RAIDs of the storage resource pool comprises:
   acquiring the number of RAID extents for each RAID in the storage resource pool; and
   determining a RAID with the largest number among the plurality of RAID as the target RAID.

10. An electronic device, comprising:
a processor; and
a memory coupled to the processor, wherein the memory has instructions stored therein which, when executed by the processor, cause the device to perform actions comprising:
  selecting a target Redundant Array of Independent Disks (RAID) from a plurality of RAIDs in a storage resource pool;
  determining a local neighbor matrix of the target RAID based on the target RAID, wherein the local neighbor matrix indicates distribution of a plurality of storage extents of a plurality of RAID extents of the target RAID on the storage resource pool; and
  performing a resource reallocating operation on the storage resource pool based on the local neighbor matrix;
wherein determining a local neighbor matrix of the target RAID based on the target RAID comprises:
  determining an iteration step size based on a width of the storage resource pool and a width of the RAID extent;
  determining, for the target RAID, a set comprising a plurality of RAID extent groups, wherein the number of RAID extents in each RAID extent group of the plurality of RAID extent groups is equal to the iteration step size; and
  traversing the set to determine the local neighbor matrix.

11. The electronic device according to claim 10, wherein performing a resource reallocating operation on the storage resource pool based on the local neighbor matrix comprises:
  determining whether the target RAID has local congestion based on the local neighbor matrix; and
  shuffling, in response to a determination that the target RAID has local congestion, the storage resource pool to optimize the distribution.

12. The electronic device according to claim 11, wherein the set is a first set, and determining whether the target RAID has local congestion based on the local neighbor matrix comprises:
  determining, for the target RAID, a second set comprising a plurality of RAID extent groups, wherein the number of RAID extents in each of the plurality of RAID extent groups of the second set is an integral multiple of the iteration step size;
  traversing the second set to determine the local neighbor matrix; and
  determining, based on the local neighbor matrix, whether the target RAID has local congestion.

13. The electronic device according to claim 11, wherein performing a data shuffling operation on the storage resource pool in response to a determination that the target RAID has local congestion comprises:
  optimizing the local neighbor matrix to improve uniformity of the distribution; and
  shuffling the storage resource pool based on the optimized local neighbor matrix.

14. The electronic device according to claim 13, wherein the actions further comprise:
  determining a global neighbor matrix with the local neighbor matrix as an initial value, wherein the global neighbor matrix indicates distribution of storage extents of RAID extents of all RAIDs in the storage resource pool on the storage resource pool; and
  updating the global neighbor matrix based on the optimized local neighbor matrix.

15. The electronic device according to claim 14, wherein the target RAID extent is a first RAID extent, the local neighbor matrix is a first local neighbor matrix, and the actions further comprise:
  selecting a second RAID from the plurality of RAID of the storage resource pool, wherein the number of RAID extents of the second RAID is less than that of the first RAID;
  determining a second local neighbor matrix based on the second RAID;
  determine, based on the second local neighbor matrix, whether the second RAID has local congestion;
  optimizing the second local neighbor matrix in response to a determination that the second RAID has local congestion;
  shuffling the shuffled storage resource pool based on the optimized second local neighbor matrix; and
  updating the global neighbor matrix based on the optimized second local neighbor matrix.

16. The electronic device according to claim 15, wherein shuffling the shuffled storage resource pool based on the optimized second local neighbor matrix comprises:
  shuffling an unoptimized RAID extent; and
  shuffling an optimized RAID extent in response to that the unoptimized RAID extent does not exist.

17. The electronic device according to claim 15, wherein the actions further comprise:
  determining whether the second RAID is the last RAID in the storage resource pool;
  determining, in response to a determination that the second RAID is the last RAID in the storage resource pool, the global neighbor matrix based on the shuffled storage resource pool; and
  selecting, in response to that the second RAID is not the last RAID in the storage resource pool, a third RAID in the storage resource pool, wherein the number of RAID extents of the third RAID is less than that of the second RAID.

18. The electronic device according to claim 10, wherein selecting the target RAID from a plurality of RAIDs of the storage resource pool comprises:
  acquiring the number of RAID extents for each RAID in the storage resource pool; and
  determining a RAID with the largest number among the plurality of RAID as the target RAID.

19. A computer program product having a non-transitory computer readable medium which stores a set of instructions for data storage; the set of instructions, when carried out by computerized circuitry, causing the computerized circuitry to perform a method of:
  selecting a target Redundant Array of Independent Disks (RAID) from a plurality of RAIDs in a storage resource pool;
  determining a local neighbor matrix of the target RAID based on the target RAID, wherein the local neighbor matrix indicates distribution of a plurality of storage extents of a plurality of RAID extents of the target RAID on the storage resource pool; and
  performing a resource reallocating operation on the storage resource pool based on the local neighbor matrix;
wherein determining a local neighbor matrix of the target RAID based on the target RAID comprises:
  determining an iteration step size based on a width of the storage resource pool and a width of the RAID extent;
  determining, for the target RAID, a set comprising a plurality of RAID extent groups, wherein the number of RAID extents in each RAID extent group of the plurality of RAID extent groups is equal to the iteration step size; and traversing the set to determine the local neighbor matrix.

20. A method for data storage, comprising:

selecting a target Redundant Array of Independent Disks (RAID) from a plurality of RAIDs in a storage resource pool;

determining a local neighbor matrix of the target RAID based on the target RAID, wherein the local neighbor matrix indicates distribution of a plurality of storage extents of a plurality of RAID extents of the target RAID on the storage resource pool; and performing a resource reallocating operation on the storage resource pool based on the local neighbor matrix;

wherein selecting the target RAID from a plurality of RAIDs of the storage resource pool comprises:

acquiring the number of RAID extents for each RAID in the storage resource pool; and determining a RAID with the largest number among the plurality of RAID as the target RAID.

* * * * *